United States Patent [19]

Starr et al.

[11] 4,059,427
[45] Nov. 22, 1977

[54] ELECTRIC GLASS SHEET HEATING FURNACE AND METHOD OF USING

[75] Inventors: Eugene W. Starr, Allison Park; George W. Misson, Franklin Township, Butler County, both of Pa.

[73] Assignee: PPG Industries, Inc., Pittsburgh, Pa.

[21] Appl. No.: 728,808

[22] Filed: Oct. 1, 1976

[51] Int. Cl.² .................................................. C03B 29/00
[52] U.S. Cl. .................................... 65/25 A; 65/114; 65/119; 65/182 A; 65/349
[58] Field of Search ................. 65/104, 107, 114, 119, 65/25 A, 182 A, 349, 350, 356

[56] References Cited

U.S. PATENT DOCUMENTS

| | | | |
|---|---|---|---|
| 1,837,311 | 12/1931 | Amsler | 65/119 |
| 3,048,383 | 8/1962 | Champlin | 65/25 A |
| 3,223,501 | 12/1965 | Fredley et al. | 65/25 A |
| 3,332,759 | 7/1967 | McMaster et al. | 65/25 A |
| 3,338,697 | 8/1967 | McMaster et al. | 65/182 A |
| 3,425,818 | 2/1969 | Plumat | 65/182 A |
| 3,551,130 | 12/1970 | McMaster | 65/182 A |
| 3,607,173 | 9/1971 | McMaster et al. | 65/25 A |
| 3,637,362 | 1/1972 | Oelke et al. | 65/25 A |
| 3,754,885 | 8/1973 | Bowman | 65/119 |
| 3,809,542 | 5/1974 | Lythgoe et al. | 65/33 |
| 3,884,667 | 5/1974 | Schraven | 65/119 |

OTHER PUBLICATIONS

"Transvector Air Flow Amplifiers," by Vortec Corp.-4511 Reading Rd., Cincinnati, Ohio, 45229.
"Jet-Flo Transducer," Bulletin UFC-300 by Union Flonctics Corp., P.O. Box H. Imperial, Pa. 15126.
"Jetflow 100 Airmover," Ref. 60G(173), by Olin Energy Systems Ltd., North Hylton Road, Sunderland, England SR5 3JD.

Primary Examiner—Arthur D. Kellogg
Attorney, Agent, or Firm—Dennis G. Millman

[57] ABSTRACT

In a furnace for electrically heating sheets of glass wherein the glass is supported on a layer of gas, hot furnace gases are internally recirculated by gas flow entrainment means, preferably an air flow amplifier utilizing the Coanda effect. Air supply tubes are electrically heated and arranged over the glass to provide the furnace with thermal energy.

9 Claims, 3 Drawing Figures

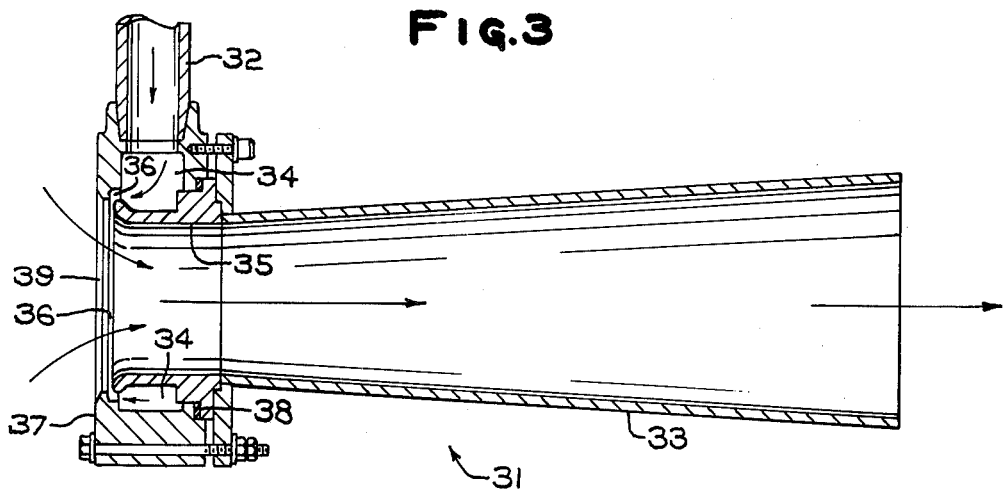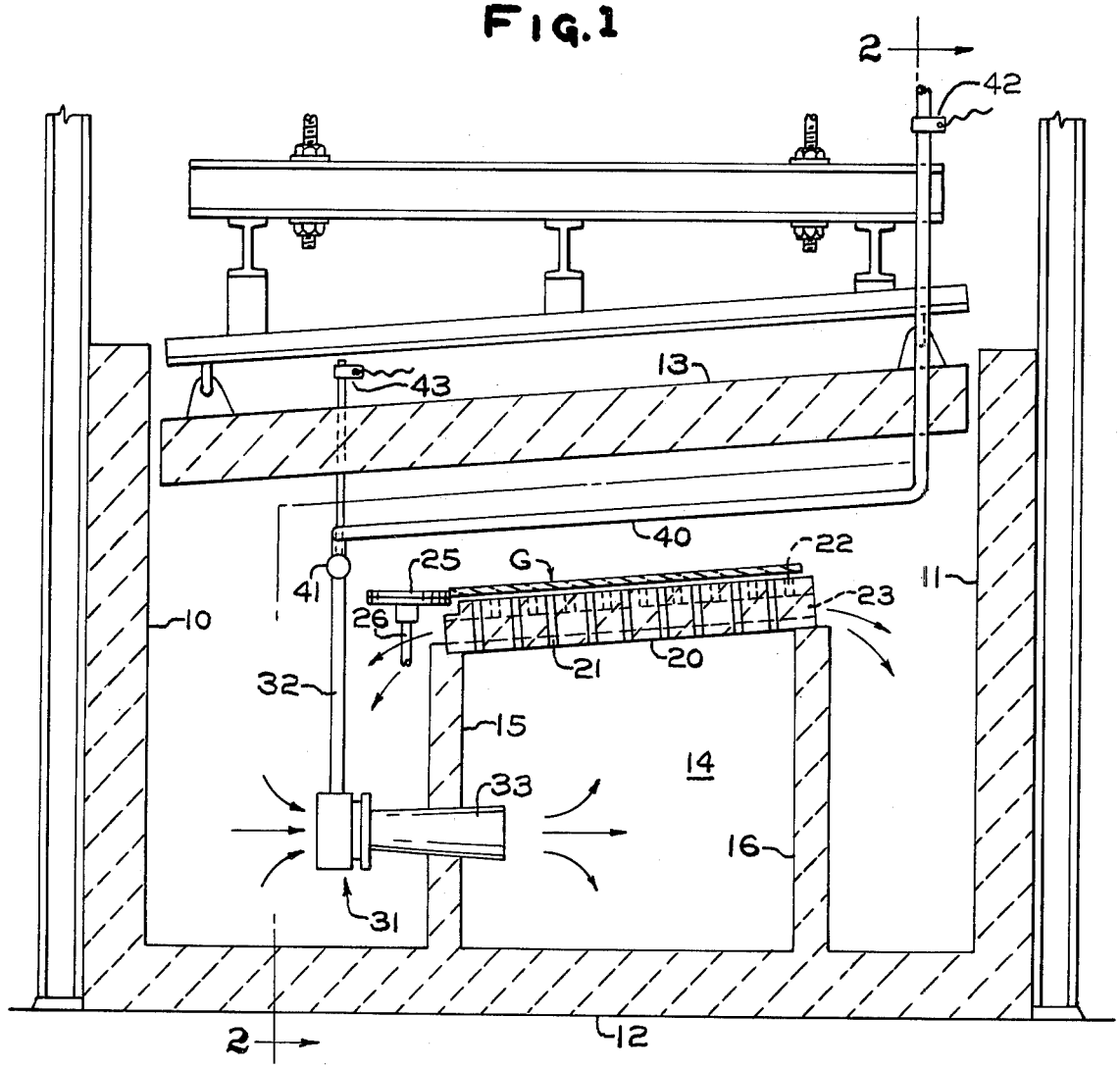

ELECTRIC GLASS SHEET HEATING FURNACE AND METHOD OF USING

CROSS-REFERENCE TO RELATED APPLICATION

This application is related in subject matter to U.S. patent application Ser. No. 728,829, filed on even date herewith by E. W. Starr, entitled "Method and Apparatus for Heating Glass Sheets with Recirculated Gas."

BACKGROUND OF THE INVENTION

This invention relates to furnaces for heating glass articles, in particular glass sheets, of the type wherein the glass is subjected to blasts of hot gas and/or supported on a layer of hot gas. Such furnaces are typically employed to heat the glass in preparation for tempering, bending, or other treatment. Examples of gas-support furnaces for heating glass sheets may be seen in U.S. Pat. No. 3,223,501 to Fredley et al. and in U.S. Pat. No. 3,332,759 to McMaster et al.

It is customary with such furnaces to utilize a blower to generate the pressure required to blast the hot gases against the glass, and it is preferred to recirculate the hot gases from the furnace back through the blower in order to conserve energy. But providing such a recirculating blower is usually a problem. If the blower is located within the furnace enclosure itself, it must be made of costly heat resistant materials, but even then the severe operating conditions often lead to excessive wear and frequent maintenance problems. In an attempt to overcome this problem, blowers have been placed outside the furnace, and the hot gases conducted to and from the furnace through conduits. However, this approach does not entirely avoid the problem because operating conditions for the blowers are still quite severe, and withdrawing the gases from the furnace causes disadvantageous heat losses. Moreover, the energy consumption of such a blower is relatively heavy regardless of location, and thus it would be desirable to provide pressurized air to a glass treating furnace by more efficient means.

One alternative to the use of a blower is disclosed in U.S. Pat. No. 3,607,173 to McMaster et al. An external source of compressed air is used to draw furnace gases into a plurality of venturi devices termed "inspirators." While that arrangement eliminates the need for a hot gas blower, it is apparent that it represents fewer economies in energy usage than would be desired since the large number of inspirators shown would require a large amount of compressed air. Even more significant is the difficulty which such an arrangement presents in heating the incoming compressed air without harmfully detracting from the amount of heat imparted to the top surface of the glass. This is because providing sufficient heat transfer area for the large number of compressed air lines in front of the gas burners could obstruct the transfer of heat onto the top surface of the glass. Furthermore, the transfer of heat through the compressed air pipes is a limiting factor.

Glass heating furnaces of the gas-support type usually employ the combustion of gaseous fuels, usually natural gas, as their energy source. In view of the recent shortages and occasional, localized curtailment of natural gas supplies, as well as the rising costs of gaseous fuels, it would be desirable to provide this type of furnace with the capability of using electrical energy as its sole or major heat source, but to do so has heretofore been considered too inefficient.

SUMMARY OF THE INVENTION

The present invention employs air entrainment means, such as the inspirators disclosed in U.S. Pat. No. 3,607,173, in combination with electrically heated tube heaters to overcome the drawbacks of the prior art in recirculating hot furnace gases in the type of glass sheet heating furnace where sheets of glass are supported on a layer of hot gases. Air entrainment means include known devices which utilize a small volume of pressurized fluid to induce a large volume fluid flow without the use of moving parts. Since there are no moving parts, the air entrainment means can be located wholly within the furnace enclosure without the maintenance problems associated with a conventional blower. As a result, the hot furnace gases can be recirculated without leaving the furnace and can be fed directly to the plenum of a gas support bed. The preferred air entrainment means is known as an "air flow amplifier" or "air mover" which employs the Coanda effect to induce entrainment of a greatly amplified volume of flow. A single air flow amplifier can replace a large, space-consuming blower in providing adequate gas pressure for supporting sheets of glass. The air flow amplifier is also preferred because the relatively small amount of compressed air used to produce adequate entrainment requires minimal energy to be preheated to furnace temperatures.

It has also been found that the use of air entrainment means in combination with electric tube heaters enables this type of furnace to employ all-electric heating with a high degree of efficiency. Incoming compressed air for driving the air entrainment means is heated by passing through a tube heater employing electrical resistance heating along the tube wall itself. The tube is arranged closely adjacent to the upper surface of the glass passing through the furnace so that the electrical energy serves the double function of heating the glass directly as well as the compressed air. The electric resistance tube heaters of the present invention require less space between the glass and the furnace roof than do conventional fuel-burning heaters. This permits the volume of the furnace enclosure to be reduced, thereby lowering the thermal energy requirement of the furnace and rendering the furnace even more efficient. As a result, the thermal efficiency of such a furnace (the percentage of the thermal energy input which is converted into useful heating of the glass) can attain levels on the order of 50 percent, as opposed to a typical optimum efficiency of about 35 percent with a conventional gas-fired, blower-recirculated furnace, and as low as about 10 percent and sometimes even lower with a non-recirculating furnace.

THE DRAWINGS

FIG. 1 is a transverse cross-sectional view of a gas-fired glass sheet heating furnace employing an air flow amplifier and resistance tube heaters in accordance with the preferred embodiment of the present invention to provide pressurized gas for supporting the glass sheets.

FIG. 3 is an enlarged cross-sectional view along the axis of an air flow amplifier.

DETAILED DESCRIPTION

Figure 2:
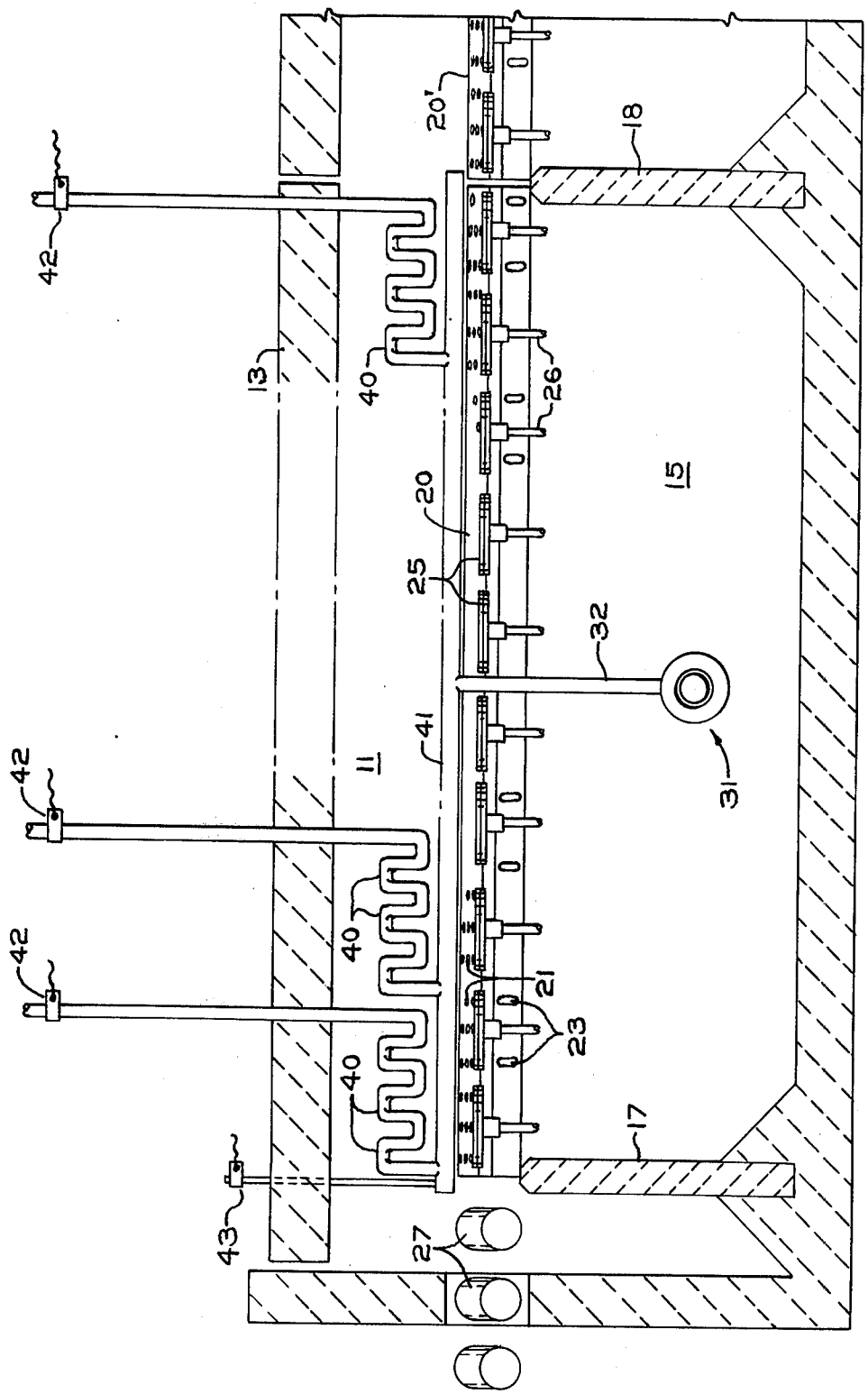
FIG. 2 is a longitudinal cross-sectional view of the furnace of FIG. 1 taken along line 2—2 in FIG. 1.

In FIGS. 1 and 2 there is shown schematically one zone of a typical tunnel-type furnace for heating glass sheets as they are continuously conveyed therethrough. The furnace consists generally of refractory walls 10, 11, and 12 and roof 13. A plenum chamber 14 is defined by refractory slabs 15, 16, 17, and 18 and hearth block 20, the latter having a large number of gas passages 21 bored therethrough to form a gas support bed for the glass. Hearth block 20 also includes a large number of exhaust holes 22 communicating with a plurality of cross-bores 23. The rows of gas passages 21 and the cross-bores 23 are shown in the drawings as lying parallel to the plane of the page for the sake of simplicity, but it is usually preferred that they extend across the block at an angle slightly oblique to the direction of glass travel. Pressurizing the plenum 14 causes heated gas to move upward through passages 21 to heat the underside of a sheet of glass G and to support the glass on a layer of gas. The gas escapes from the space between the hearth block 20 and the glass through the exhaust holes 22 and returns to the main furnace enclosure by way of cross-bores 23. Other forms of gas support beds as are known in the art may be employed as well. The hearth block is tilted at a slight angle from horizontal to cause the lower side edge of the glass sheet to bear against drive wheels 25. Each drive wheel is mounted on a shaft 26 which extends out of the furnace where it is associated with drive means (not shown) for rotating the shaft and the wheel. The glass sheets are brought into the furnace on rolls 27 and, as viewed in FIG. 2, propelled from left to right by the drive wheels 25 across hearth block 20 and onto the hearth block 20' of the next furnace zone, if any. Further details of the overall construction and operation of this type of furnace are not necessary for an understanding of this invention. Moreover, such details are well known to those in the art as evidenced by a large number of U.S. patents, such as the aforementioned U.S. Pat. Nos. 3,223,501 and 3,332,759, the disclosures of which are hereby incorporated by reference.

The specific embodiment shown in the drawings employs only electric heating as the source of thermal energy. Thus the gas within the enclosure is air and the terms "air" and "gas" may be used interchangeably in connection with the present invention. But it should be understood that the gas could include combustion products (e.g., from a fuel-burning auxiliary heater) or inert gases as well.

The preferred embodiment shown in the drawings uses an air flow amplifier 31 to recirculate the hot gases within the furnace and to pressurize plenum 14. Compressed air is supplied to the air flow amplifier by tube 32, and the amplified gas flow is discharged through flared tube 33. The air flow amplifier and the pipe 32 should be made of a material able to withstand high temperatures such as a high temperature-resistant stainless steel. As used herein, the term "air flow amplifier" is intended to mean any device which utilizes the Coanda effect to make a small fluid stream induce a much larger fluid flow. The Coanda effect, a well-known principle of fluid dynamics, is the tendency of a fluid coming out of a jet to closely follow the contour of an adjacent wall rather than follow a straight line. How this is put to use in an air flow amplifier may be illustrated by referring to the cross-sectional view of amplifier 31 shown in FIG. 3. The fluid stream that provides the motivating force, which may be termed the "primary gas" (usually compressed air), flows from inlet pipe 32 into an annular manifold 34 around the outside of a cylindrical throat member 35. The air is then throttled through an annular gap 36 between a curved lip portion of throat 35 and outer annular manifold housing 37. The width of gap 36 is determined by the thickness of a gasket 38. Air passing through gap 36 attains a very high velocity which, for typical input pressures, may be on the order of sonic velocity. This thin, high velocity, annular stream of air closely follows the curved interior surface of throat 35 in accordance with the Coanda effect, and in so doing, imparts a powerful entrainment force on any gases within the amplifier. As a result, large volumes of gas (the "secondary gas") are drawn into a suction opening 39 and discharged at a high velocity through flared tube 33.

The degree of amplification achieved by such an arrangement is influenced by the pressure of the compressed air input, the width of gap 36, the back-pressure against which the output stream must work, and the design of the particular amplifier used. An airflow amplifier of the type shown in FIG. 3 generally operates effectively at input pressures (measured at the manifold 34) from about 0.5 psig (4000 Pa) to about 60 psig (400,000 Pa) and with a gap width of about 0.003 inch (0.08 millimeters) to about 0.115 inch (3 millimeters). With discharge into free air at room temperature, the amplification ratio of secondary air volume flow rate to primary air volume flow rate can typically be on the order of 10:1 to 20:1 or even higher. When the amplifier is discharging into a pressurized plenum as shown in FIG. 1, the amplification ratio will be somewhat lower than if it were discharging into free air, but the moderate back-pressure typically encountered in this type of furnace does not preclude a highly efficient and effective amplification. It should also be noted that the amplification ratio may also be decreased with increasing temperature.

Specific dimensions and operating parameters for an air flow amplifier used in accordance with this invention depend upon the total gas flow requirement for the furnace zone involved, which in turn is largely determined by the particular structural design of the furnace. However, the following illustrative example may be useful as a general guideline. In a conventional glass heating furnace having the general configuration shown in the figures, a plenum pressure of no more than about four ounces per square inch (1700 Pa) is commonly found to be adequate for supporting and heating glass sheets of about ⅛ inch (3 millimeters) to ¼ inch (6 millimeters) in thickness. To maintain such a plenum pressure in one furnace zone 34 inches (86 centimeters) wide and 100 inches (254 centimeters) long, a single air flow amplifier with a 4 inch (10 centimeter) throat diameter may suffice if provided with a compressed air input of about 140 standard cubic feet per minute (4 cubic meters per minute) at a pressure (measured at the manifold 34) of about 5 psi (34,500 Pa) to 20 psi (138,000 Pa). A suitable air flow amplifier is the "Jet-Flo Transducer AGV-100" sold by Union Flonetics Corp., Imperial, Pa.

An example of another, but less advantageous, air entrainment means which may be used in place of air flow amplifier 31 is the inspirator device disclosed in U.S. Pat. No. 3,607,173, disclosure of which is hereby incorporated by reference.

The continual feeding of compressed air into the furnace may cause some pressurization of an enclosure which is particularly airtight, but leakage from most furnaces usually avoid any substantial pressurization. If desired, a vent may be provided through the furnace wall to relieve any excess pressure.

Because the gases directed at the underside of the glass must heat the glass as well as support it, the output from the air flow amplifier should not be cooled by the mixing of unheated compressed air with there cycled furnace gases, and in some cases it is preferred that the temperature of the recycled gases be increased. Accordingly, the specific embodiment shown includes means for heating the compressed air stream to a temperature preferably at least as great as the average furnace temperature. Rather than withdrawing thermal energy from the hot environment of the furnace itself, it has been found to be considerably more efficient to heat the incoming compressed air directly by electrical resistance heating in the compressed air tube itself. Heating takes place in tube sections 40 which are preferably provided with serpentine configurations as shown, extending in an array over the support bed 20, spaced from, but closely adjacent to, the glass sheets carried on the bed. One end of each tube section extends out of the furnace where it communicates with a source of compressed air (not shown), and the other end of each section communicates with the header pipe 41, which in turn feeds the combined heated air flow to the amplifier inlet pipe 32. A plurality of parallel electric circuits for heating the tube sections 40 is established by clamping electric leads 42 to the portion of each tube extending outside the furnace and providing a common ground by way of header pipe 41, such as by grounding rod 43, which extends through the furnace wall and is fastened to the header pipe. A single tube section may suffice, but a number of shorter sections advantageously provides a large area for heat transfer to the glass without requiring unduly large voltages and without unnecessary overheating of the compressed air. Only a few representative tube sections are shown in FIG. 2. Not only are considerably larger numbers of tubes typical, but also the tubes preferably overlie in a continuous array the entire path followed by the glass passing through the furnace. Heat exchange within the heater tubes can be enhanced with turbulent flow inducing means, such as a twisted stainless steel strap within the tube.

With the tube heater arrangement of the present invention, incoming compressed air is quickly and efficiently brought up to furnace temperatures since the limiting factor of heat transfer through a tube wall has been virtually eliminated. Moreover, rather than detracting from the primary thermal energy input to the furnace, the air heating arrangement itself serves as the primary energy source for heating the glass. Thus, a single electric heating means serves the dual function of simultaneously heating both top and bottom sides of the glass with maximized heat transfer to both. Also, because the electric tube heaters can be located closer to the glass than combustion heaters, a greater portion of the heat generated is usefully transferred to the glass (both radiantly and convectively), and the size of the furnace enclosure can be reduced, thereby reducing its energy requirements.

The electrical power requirements are largely dependent on the desired temperature and air flow rates for a particular installation. Furthermore, the power requirements and the number and length of tube heater sections are interdependent and will vary from furnace to furnace. In the example set forth above, it was found to be convenient to provide ten tube heater sections along the 100 inch (254 centimeter) long furnace zone about six inches (15 centimeters) above the glass. Each section was about 20 feet (6 meters) in length, and was fabricated from ¾ inch (1.9 centimeter) outside diameter tubing of 309 stainless steel with 1/16 inch (1.6 millimeters) wall thickness. Adequate heating of both glass and compressed air may be attained with about 5 to about 25 kilowatts A.C. applied to each tube section. Such a power level can produce tube temperatures (measured on the outside) ranging from about 1250° F. (675° C.) to about 1650° F. (900° C.) and a plenum temperature a few degrees lower than the tube temperature.

Although the electric tube heater arrangement of the preferred embodiment described above is capable of efficiently providing the furnace with all of its thermal energy requirements, the use of auxiliary heating means (either electric or combustion) is not precluded. Auxiliary heaters may be desirable in particular during start-up to aid in quickly bringing the furnace up to the operating temperature.

As an optional arrangement, there may be a plurality of independently controlled tube heater sections across the width of the furnace. That is, each of the tube sections 40 could be further subdivided such that, for example, the power input over the center or either side of the support bed could be independently varied.

Other variations and modifications may be resorted to within the scope of the invention as defined by the following claims.

We claim:
1. A furnace for heating sheets of glass while supported on a layer of gas comprising:
an enclosure, a glass support bed within said enclosure having gas passages therethrough, an enclosed plenum chamber in communication with said gas passages, means for pressurizing said plenum chamber including gas entrainment means having an inlet throat in communication with ambient gas in said enclosure and an outlet opening in communication with said plenum chamber, an electrically conductive tube heater for carrying compressed gas communicating at one end with said gas entrainment means and at the other end to a source of compressed gas outside of said enclosure, whereby ambient gases in the enclosure are drawn into the plenum and forced through said passages in the support bed with sufficient pressure to establish gas support for a sheet of glass on the bed, an intermediate portion of said tube overlying the glass support bed in generally parallel, closely spaced relation thereto, and electric circuit means connected to said tube heater for passing current along and heating said intermediate portion of said tube heater, whereby the compressed gas and the glass sheets are heated by means of electric energy applied to said tube heater.

2. The furnace of claim 1 wherein the intermediate portion of the tube heater is provided with a serpentine configuration with each segment substantially equidistant from the glass support bed.

3. The furnace of claim 2 wherein a plurality of said tube heaters overlie the gas support bed, each communicating with the gas entrainment means by way of a common header pipe, and each associated with separate circuit means so as to be electrically in parallel.

4. The furnace of claim 3 wherein the gas entrainment means comprises a Coanda effect air flow amplifier.

5. The furnace of claim 1 wherein the gas entrainment means comprises a Coanda effect air flow amplifier.

6. A method of heating a sheet of glass while supported on a layer of gas comprising transporting a sheet of glass into an enclosure and into a position overlying a support bed having gas passages communicating with a plenum chamber therebelow, establishing an entrained gaseous flow from a source of compressed gas with gas entrainment means within the enclosure thereby drawing ambient gas from the enclosure into the gas entrainment means and discharging the ambient gas into the plenum chamber so as to pressurize the plenum chamber and force gas through the support bed passages with sufficient pressure to support the sheet of glass on the gas, passing the incoming stream of compressed gas being fed to the gas entrainment means through a tube heater overlying the path of glass travel through the enclosure in closely spaced, generally parallel relation thereto, passing electric current through the tube heater to heat the compressed gas passing through the tube heater and the glass passing beneath the tube.

7. The method of claim 6 wherein said entrainment is carried out by means of a Coanda effect air flow amplifier.

8. The method of claim 7 wherein the electric resistance heating comprises the major portion of the thermal input to the enclosure.

9. The method of claim 8 wherein the compressed gas is air and the ambient gas is air.

* * * * *